FILTER

Filed July 19, 1951 2 Sheets-Sheet 1

INVENTOR.
LAWRENCE HARRIS
BY Harry L. Shenier
ATTORNEY

Aug. 30, 1955 L. HARRIS 2,716,734

FILTER

Filed July 19, 1951 2 Sheets-Sheet 2

← FREQUENCY OR t →

INVENTOR.
LAWRENCE HARRIS

BY. Henry L. Shenier

ATTORNEY

United States Patent Office 2,716,734

Patented Aug. 30, 1955

2,716,734

FILTER

Lawrence Harris, Brooklyn, N. Y., assignor, by mesne assignments, to Norden-Ketay Corporation, New York, N. Y., a corporation of Illinois Application July 19, 1951, Serial No. 237,615

6 Claims. (Cl. 333—77)

My invention relates to filters and more particularly to an interstage coupling filter having desired characteristics.

It is well known that high-Q coupled circuits can be put in many equivalent forms. C. B. Aiken in "Two-mesh tuned coupled-circuit filters," (Proceedings of the Institute of Radio Engineers, volume 25, pages 230–272 inclusive; February 1937) has given the important equivalents for double-tuned circuits in a form that makes it possible to analyze them by means of filter theory. Aiken and others make an assumption that $$\frac{\omega}{\omega_0}-\frac{\omega_0}{\omega}$$

is equivalent to $$\frac{\Delta\omega}{\omega_0}$$

where $\omega$ is the actual frequency, $\omega_0$ is the resonant frequency and $\Delta\omega$ is the band width. This assumption may be termed the "narrow band assumption" and is valid only if the ratio of the band width to the mid-frequency is small, say, less than 5%.

We can analyze two resonant circuits coupled together in terms of filter theory since, as shown by Aiken, such a circuit is the equivalent of a filter.

Figure 1 shows two stages of an intermediate frequency amplifier coupled by two resonant circuits. Figure 2 shows the equivalent filter circuit corresponding to the double-tuned circuit of Figure 1.

In Figure 1 the capacitor $C_A$, the resistor $R_A$ and the inductor $L_A$ are part of the first resonant circuit. The capacitor $C_B$, the resistor $R_B$ and the inductor $L_B$ are part of the second resonant circuit. The interaction between the inductor $L_A$ and the inductor $L_B$ may be considered as a separate inductor $L_M$. In the equivalent circuit in Figure 2 the resistance of the resistor $R_1$ is equal to the resistance of the resistor $R_A$. The capacitance of the capacitor $C_1$ is equal to the capacitance of the capacitor $C_A$. The capacitance of the capacitor $C_2$ is equal to the capacitance of the capacitor $C_B$. The resistance of the resistor $R_2$ is equal to the resistance of the resistor $R_B$. The inductance of the inductor $L_2$ is equal to the inductance of the interaction between inductors $L_A$ and $L_B$. The sum of the inductances of the inductors $L_1$ and $L_2$ is equal to the inductance of the inductor $L_A$. The sum of the inductances of the inductors $L_2$ and $L_3$ is equal to the inductance of the inductor $L_B$.

In the prior art, if two resonant circuits were tuned to the same frequency and were coupled, the interaction shifted the resonant frequency and gave a pass band action. Starting with a loose coupling, as the coupling is tightened we reach a point where the frequency characteristic curve reaches its widest band without double peaking. This point of coupling is known to the art as the "critical coupling." The shape of the frequency characteristic curve is shown in Figure 3 where the coupling is at the critical coupling and is designated as the curve "$n=1$" in Figure 3 where $n$ is the coefficient of coupling. The ratio of the band width to the mid-frequency is always of limited magnitude, being usually less than 5%.

If it be attempted to increase the band width by a further tightening of the coupling, the frequency characteristic curve exhibits double peaking with ensuing distortion of the signal. Furthermore, if the tuned circuit forms the interstage coupling device of an amplifier the double peaking will tend to produce shape changes of the output signal with respect to the input signal and may cause the amplifier to oscillate. Then too, this distortion is increased by the fact that the peaks are asymmetric both in amplitude and in the frequency of their occurrence. In Figure 3 a typical curve showing what happens when the coupling is increased beyond the critical coupling is shown by the curve indicated by "$n=10$." Here the ratio of the actual coupling to the critical coupling is 10. It will be seen that the peak in the direction below resonance is much higher than the peak in the direction above resonance. Furthermore, the frequency at which the above resonance peak occurs is further removed from the resonant frequency than is the frequency at which the below resonance peak occurs.

In the prior art it was attempted to correct for this phenomenon by the use of stagger-tuned interstages. This practice is not completely satisfactory and increases the number of tubes which have to be employed. Other attempts have been made to widen the band by the use of triple-tuned circuits. This practice increases the number of electrical arrangements per interstage with a resulting increase in cost and complexity of construction.

One object of my invention is to provide an interstage coupling filter having a wide band and having a ratio of band width to mid-frequency as high as 200% without encountering the deleterious effects of the prior art.

Another object of my invention is to provide a filter which has a frequency characteristic which is controllable and monotonically decreasing on both sides of mid-frequency over any desired band width.

A further object of my invention is to provide a filter having a substantially symmetrical double peaked pass band in which the peaks are of the same amplitude and are of controllable magnitude.

Other and further objects will appear from the following description.

In the prior art of double-tuned circuits, each of the resonant circuits was tuned to the same frequency which was the mid-frequency. I have discovered that it is possible to build a double-tuned coupling device which is a filter by tuning both of the resonant circuits to a frequency which is not the mid-frequency, which will give a very wide band width without any of the deleterious effects of the prior art. My filter is such that it has a frequency characteristic which is controllably monotonically decreasing on both sides of the mid-frequency over any desired band with and in which the pass band is symmetrical on both sides of the mid-frequency. I have found it is possible to provide a filter in which the frequency characteristic curve is not only symmetrical with respect to amplitude, but also symmetrical with respect to the frequency of the occurrence of the peaks. I have found it is possible to provide a filter in which the amplitude of the peaks is controllable.

I shall define the band width ratio K as follows:

$$K=\frac{\text{band width}}{2\text{ mid-frequency}} \quad (a)$$

In any resonant circuit there is always present resistance R, capacitance C and inductance L. $\omega_0$, the resonant frequency, is obtained as follows:

$$\omega_0=\frac{1}{\sqrt{LC}}$$

The resistance need not be present in the form of a shunt resistor but is always present due to the fact that inductors are made of conductors having resistance and the resistance in each case is to be considered as the equivalent of a shunt resistance.

Figure 3:
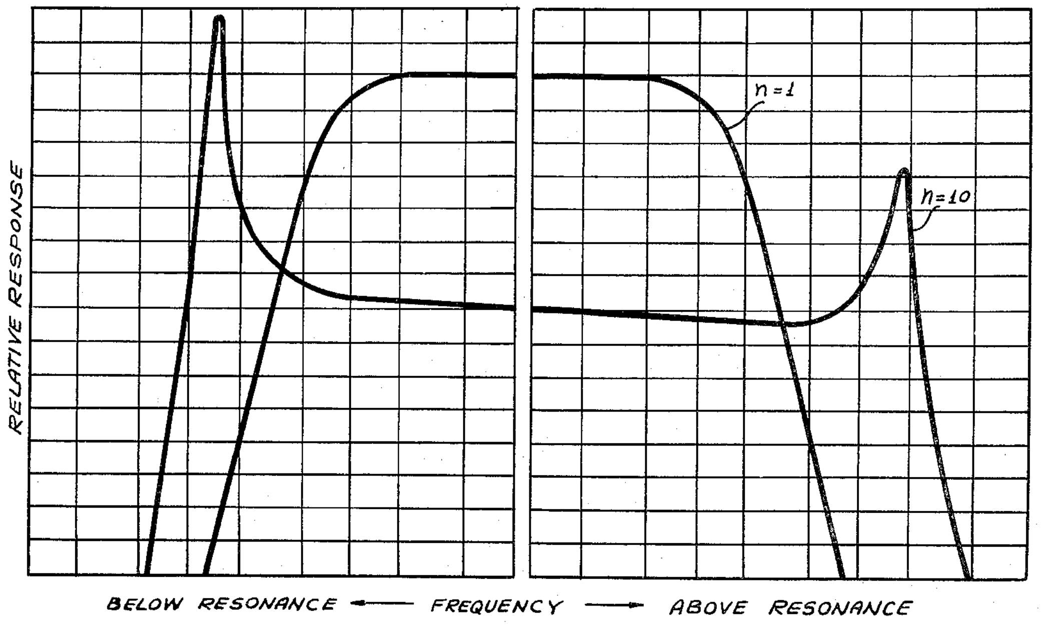
Figure 3 is a graph showing frequency characteristic curves showing two resonant circuits tuned to the same frequency and coupled together at the critical coupling and at a coupling ratio of 10.

Inasmuch as double-tuned circuits of the prior art were always tuned to the same resonance, as pointed out above and shown in Figure 3, the frequency characteristic curve exhibits asymmetry when it was attempted to increase the width of the pass band by tightening the coupling.

For purposes of convenience I will treat all frequencies as angular frequencies in radians per second, that is, the actual frequency in cycles per second multiplied by $2\pi$.

In my filter the two resonant circuits have terminating resistances which differ from the characteristic image impedances and hence are mismatched. I shall designate the mismatch ratio as $\alpha$. It is defined as $$\alpha=\frac{\text{actual terminating resistance}}{\text{characteristic image impedance at mid-frequency}}$$

I have discovered certain theorems. Their derivation is unimportant. They provide tools by which those skilled in the art can contruct filters having desired frequency characteristic curves in accordance with my invention.

The coefficient of coupling $n$ is defined as the quotient of the mutual inductance divided by the square root of the product of the self-inductances.

*Theorem I*

A double-tuned circuit will have a frequency characteristic with two maxima whenever the mismatch ratio $\alpha$ is greater than $$\sqrt{\frac{1}{2}(1+\sqrt{1-n^2})}$$

If $\alpha$ is less than $$\sqrt{\frac{1}{2}(1+\sqrt{1-n^2})}$$

no well defined maxima exist and the network never reaches its maximum attainable gain.

If $\alpha$ equals $$\sqrt{\frac{1}{2}(1+\sqrt{1-n^2})}$$

one maximum exists and the circuit is said to be critically coupled,

Let:

$$t\text{ (frequency parameter)}=\frac{\omega}{\omega_0}$$

$$\tan\theta_{-1}=\frac{\alpha(t^2-1+n)}{nt}$$

$$\tan\theta_{+1}=\frac{-\alpha(t^2-1-n)}{nt}$$

$$\gamma=\theta_{+1}+\theta_{-1}$$

$$y=\sin\gamma$$

$$v=\cot\gamma$$

$$b=\sqrt{1-n^2}$$

$$a=1-\frac{n^2}{2\alpha^2}$$

$$v=\frac{t^4-2at^2+b^2}{4\alpha(1-a)t}$$

It was seen above that if $\alpha$ equaled $$\sqrt{\frac{1}{2}(1+\sqrt{1-n^2})}$$

the circuit was said to be critically coupled and only one maximum existed. Let us designate this condition as $\alpha_0$, that is, $\alpha_0$ is the critical mismatch ratio.

Figure 4:
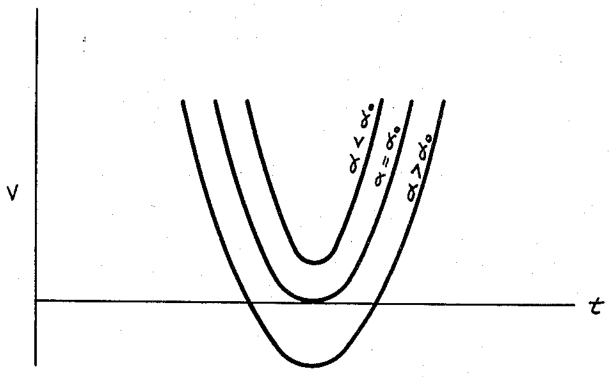
Figure 4 is a series of curves of a function of the frequency parameter against the frequency parameter with various mismatch ratios.

Plotting curves of $v$ against $t$ we obtain a family of curves shown in Figure 4 for the three possible cases, namely, where the actual mismatch ratio is less than the critical mismatch ratio, the actual mismatch ratio is at the crtical mismatch ratio, and where the actual mismatch ratio is greater than the critical mismatch ratio. It will be seen by reference to Figure 4 that when the actual mismatch ratio is less than the critical mismatch ratio, the roots of the equation will be complex and consequently no real value exists. When the actual mismatch ratio is at the critical mismatch ratio, only one maximum exists, that is, the curve is tangent to the X-axis. It will be further noted that when the actual mismatch ratio is greater than the critical mismatch ratio the curve cuts the X-axis at two points, indicating two roots for the equation and hence two maximum values indicating the two peaks.

The second theorem which I have discovered is

*Theorem II*

The maxima in the frequency characteristic curve occur at those frequencies where the load resistance equals the characteristic image impedance.

*Theorem III*

The minimum gain within the pass band occurs at the mid-point of the band when the pass band width is defined by the two points having the same attenuation as the mid-point.

Figure 5:
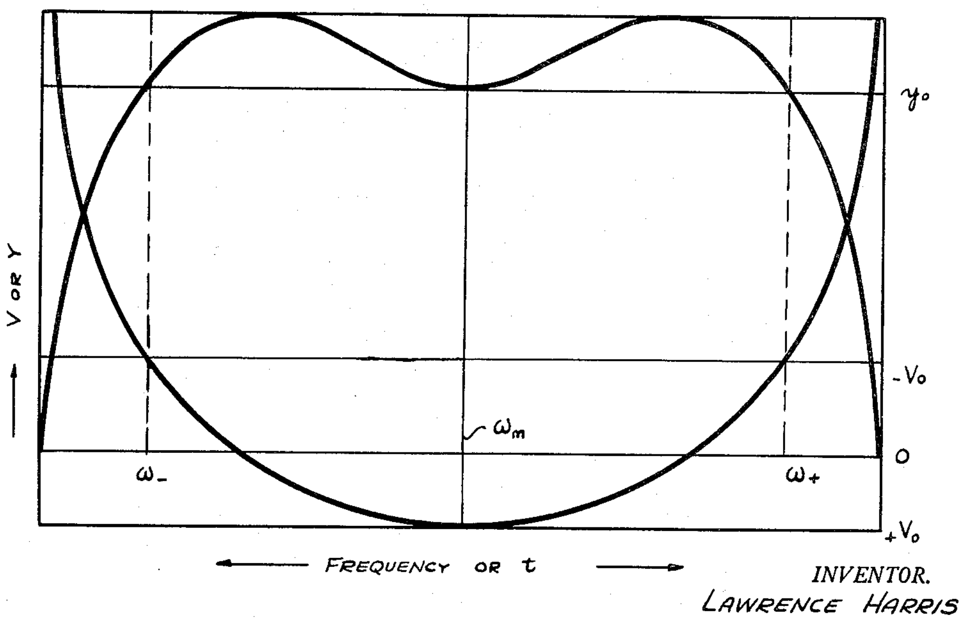
Figure 5 is a graph showing one of the curves shown in Figure 4 plotted against a frequency characteristic curve obtained with a filter in accordance with my invention.

Considering Theorem II, between two maxima that occur in the frequency characteristic a minimum must occur when $\alpha$ is greater than $\alpha_0$. Since at the maxima in this characteristic the angle $\gamma$ is $$\frac{\pi}{2}$$

radians, the value of this angle between the peaks must be greater than $$\frac{\pi}{2}$$

radians and $v$ must be negative between them. Then, too, the minimum of the $v$ curve will occur at the same point as the minimum on the frequency characteristic or $y$ curve, since the least value of $y$ corresponds to the maximum value of $\gamma$ because the latter is greater than $$\frac{\pi}{2}$$

radians. Figure 5 shows these relationships, $t_0$ being the value of $t$ when $y$ is minimum.

The gain at any frequency can be compared with any maximum gain. A curve of the gain at a frequency with respect to the maximum gain of this frequency as the frequency varies is called a frequency characteristic curve. $y$ can be considered as the ratio of gain at a frequency $\omega$ over the maximum gain. $y_0$ may be considered as the unitized gain at mid-frequency, that is, the maximum unitized gain over the pass band. This is indicated in Figure 5.

Let us assume that it is desired to build a filter having a lower cut-off frequency $\omega_{-1}$, and an upper cut-off frequency $\omega_{+1}$.

I have found that the coefficient of coupling $n$ can be expressed in terms of the cut-off frequencies as follows:

$$n=\frac{\omega_{+1}^2-\omega_{-1}^2}{\omega_{+1}^2+\omega_{-1}^2}$$

Further, $\omega_0$ will be represented by the expression $$\omega_0=\sqrt{\frac{\omega_{+1}^2+\omega_{-1}^2}{2}}$$

Figure 1:
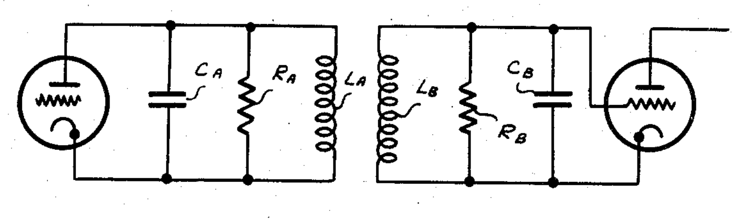
Figure 1 is a diagrammatic view showing a pair of thermionic tubes forming part of an amplifier coupled by a two-mesh tuned coupled-circuit filter showing one embodiment of my invention.
Figure 2:
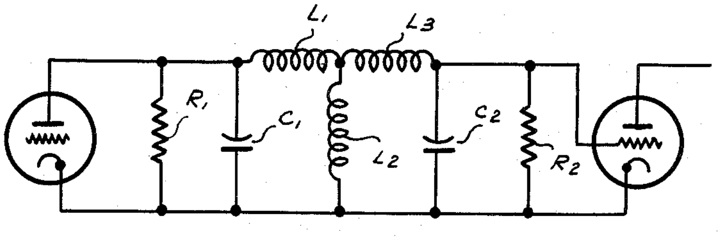
Figure 2 is a diagrammatic view showing a filter circuit equivalent to Figure 1.

The characteristic input image impedance at the angular frequency $\omega_0$ may be represented by the term $R_A$. The desired characteristic output image impedance at the frequency $\omega_0$ may be represented by the term $R_B$. The inductances and the impedances which are required for the network shown in Figure 1, according to my invention, are as follows:

$$(1)\qquad C_A=\frac{1}{R_A n\omega_0}$$

$$(2)\qquad C_B=\frac{1}{R_B n\omega_0}$$

$$(3)\qquad L_A=\frac{R_A n}{\omega_0(1-n^2)}$$

$$(4)\qquad L_B=\frac{R_B n}{\omega_0(1-n^2)}$$

It will be clear that if we are given $C_A$ and $C_B$ we can solve for $R_A$ and $R_B$ and then $L_A$ and $L_B$ can be determined from these equations.

If we build a filter with the values obtained from the equations just above, however, we will find that because the characteristic input impedance is a function of frequency, this filter, when terminated on the input and output with resistances having values of $R_A$ and $R_B$ respectively, will exhibit poor over-all input impedance and when used in the plate circuit of a thermionic tube will cause the gain to be a noncontrollable function of frequency. In order to correct for this condition and achieve a controllable, desirable frequency characteristic, the filter must terminate in resistances having values $R_{A_1}$ and $R_{B_1}$, respectively, which satisfy the following equations:

$$(5)\qquad \alpha=\frac{R_{A_1}}{R_A}=\frac{R_{B_1}}{R_B}$$

It will be recalled that $y_0$ is the unitized gain at mid-frequency which is the maximum unitized gain over the pass band. $\gamma_0$ may be represented by the expression $$(c)\qquad \gamma_0=\sin^{-1}y_0$$

where $\gamma$ lies in the second quadrant, that is, where $\gamma$ is greater than 90° but less than 180°.

$$(d)\qquad v_0=\cot\gamma_0$$

Our problem now is to determine the values of $R_{A_1}$ and $R_{B_1}$. To do this I proceed as follows: I calculate T from the equation $$(b)\qquad T=\left(\frac{4-K^2}{3}\right)^3$$

Next I find $\theta$ from the expression $$(e)\qquad \cos\frac{3\theta}{2}=\frac{K^2}{|\cos\gamma_0|\sqrt{T}}$$

We then find $t_0$ from the expression $$(6)\qquad t_0^2=\frac{6}{(2+K^2)+2(4-K^2)\cos\theta}$$

Now in the prior art the resonant frequency and the mid-frequency were the same. In my invention the resonant frequency and mid-frequency are not the same. The resonant frequency $\omega_0$ is obtained from the expression $$(f)\qquad \frac{\omega_M}{t_0}$$

where $\omega_M$ is the mid-frequency. I then determine $a$ from the expression $$(g)\qquad a=\left(\frac{2+K^2}{2}\right)t_0^2$$

and I determine $b^2$ from the expression $$(h)\qquad b^2=(1-K^2)t_0^4$$

I now determine a new $n$ from the expression $$(7)\qquad n=\sqrt{1-b^2}$$

The $\alpha$ required for Equation 5 above is determined from the expression $$(8)\qquad \alpha=\sqrt{\frac{1-b^2}{2(1-a)}}$$

Having obtained $\alpha$, the new terminating resistances can be calculated as follows:

$$R_{A_1}=\alpha R_A$$
$$R_{B_1}=\alpha R_B$$

Having a new $\omega_0$ and a new $n$ and using the old $R_A$ we now employ Equation 1 to determine a new $C_A$, namely $C_{A_1}$. Similarly, using the old $R_B$ and the new $n$ and the new $\omega_0$ we use Equation 2 to calculate $C_{B_1}$. Similarly, we use Equation 3 with $R_A$, the new $n$ and the new $\omega_0$ to calculate the new $L_A$, namely $L_{A_1}$, and calculate $L_{B_1}$ from Equation 4 with the new values obtained as outlined above.

It will be seen that there are six unknowns, namely, $C_A$, $L_A$, $R_A$, $C_B$, $L_B$ and $R_B$. We have four simultaneous equations. By assigning values to any two of the unknowns the equation can be solved for the other four.

Usuallywe we are given the maximum gain for a stage, $A_0$. If the transductance of the tube of the stage is represented by $g_m$, this may be expressed $$(j)\qquad A_0=g_m\sqrt{R_A R_B}\frac{\alpha^2}{1+\alpha^2}$$

If we assume that $R_A$ is equal to $R_B$ we may write $$R_A=R_B=\frac{A_0(1+\alpha^2)}{g_m\alpha^2}$$

The lower peak will occur at $$(a-\sqrt{a^2-b^2})\omega_0$$

and the upper peak will occur at $$(a+\sqrt{a^2-b^2})\omega_0$$

It will be seen that what I do to design my filter is to use Equations 1, 2, 3 and 4 above with modified values. I determine a resonant frequency which is not the mid-frequency by means of the expression $t_0$ (Equation 6), which I have discovered determines the shape of the desired characteristic curve. I determine a new coefficient of coupling which is determined from the band width and a function of $t_0$ (Equation 7), and I determine a mismatch ratio from an expression which is a predetermined function of the band width ratio and the desired frequency characteristic (Equation 8). I determine new terminating resistances which are functions of the mismatch ratio (Equation 5). With the old terminating resistances, the coefficient of coupling and the resonant frequency thus determined, I can calculate the values of the inductances and capacitances required to construct my filter and obtain the desired results (Equations 1, 2, 3 and 4).

As an example of the construction of a filter in accordance with my invention, let us assume that we require a filter having a 60 mc. band width centered at 60 mc. Further, it is required that there be no more than .2 db variation in the gain permitted over the pass band. The filter is to be used in a circuit in which the total input capacitance of the vacuum tube and associated circuitry is 11 mmf. and the total output capacitance is 4 mmf. The vacuum tube has a transconductance $g_m$ of 20,000 micromhos.

First, we find K, the band width ratio, from Equation $a$, as follows:

$$\frac{60}{2\times 60}=.5$$

We next find T from Equation $b$ $$\left(\frac{4-.25}{3}\right)^3=1.953125$$

Applying Theorem III and employing the decibel table well known to radio engineers, we find that .2 db corresponds to $y_0=.977237$.

From Equation $c$ we find $\gamma_0$ to be 102°-15′-00″.

From Equation $d$ we find $v_0$ to have a value of $-.217092$. The $\cos\gamma_0=-.212150$.

We now use Equation $e$ to find $$\cos\frac{3\theta}{2}$$

as follows:

$$\frac{.25}{.212150\times\sqrt{1.953125}}=.843202$$

From this we find $$\frac{3\theta}{2}$$

to be 32°-31′-13″, which gives us $$\theta=21°\text{-}40'\text{-}48.7''$$
$$\cos\theta=.929260$$

We now find $t_0$ from Equation 6

$$t_0^2=\frac{6}{(2+.25)+2(4-.25)\times.929260}=.650798$$

or $$t_0=.806721$$

We then find resonant angular frequency $\omega_0$ from Expression $f$ $$\omega_0=\frac{2\pi\times 60\times 10^6}{.806721}=467.313\times 10^6 \text{ radions per second}$$

From Equation $g$ we then determine $a$, as follows:

$$=\frac{2+.25}{2}\times .650798=.732148$$

Further, we determine $b^2$ from Equation $h$ $$b^2=(1-.25)\times(.650798)^2=.317654$$

We then determine the coefficient of coupling $n$ from Equation 7

$$n=\sqrt{1-.317654}=.826043$$

Now we determine the mismatch ratio from Equation 8 as follows:

$$\alpha=\sqrt{\frac{.682346}{2(1-.732148)}}=1.128599$$

Since the total input capacitance of the desired filter is 11 mmf., the characteristic image impedance is obtained from Equation 1

$$R_A=\frac{1}{C_An\omega_0}=$$
$$\frac{1}{11\times 10^{-12}\times .826043\times 467.313\times 10^6}=235.503 \text{ ohms}$$

We now obtain the coil inductance $L_A$ from Equations 1 and 3 in terms of $C_A$, as follows:

$$L_A=\frac{1}{C_A\omega_0^2(1-n^2)}=$$
$$\frac{1}{11\times 10^{-12}(1-.682346)(467.313\times 10^6)^2}=1.3105\mu\text{h}$$

The actual terminating resistance from Equation 5 will be $$R_{A_1}=1.128599\times 235.503=265.788 \text{ ohms}$$

Since the total output capacitance is 4 mmf. the characteristic output image impedance $R_B$ is obtained from Equation 2 thus:

$$R_B=\frac{1}{C_Bn\omega_0}=$$
$$\frac{1}{4\times 10^{-12}\times .826043\times 467.313\times 10^6}=647.633 \text{ ohms}$$

The corresponding coil inductance $L_B$ is obtained in terms of $C_B$ from Equations 2 and 4, as follows:

$$L_B=\frac{1}{C_B\omega_0^2(1-n^2)}=$$
$$\frac{1}{4\times 10^{-12}(1-.682346)(467.313\times 10^6)^2}=3.6039\mu\text{h}.$$

The actual terminating resistance is obtained from Equation 5

$$R_{B_1}=1.28599\times 647.633=832.850 \text{ ohms}$$

Under these conditions we may use Equation $j$ to determine the maximum gain for the stage.

$$A_0=$$
$$20\times 10^{-8}\sqrt{235.503\times 647.633}\times\left(\frac{1.273736}{1+1.273736}\right)=4.376$$

This gain is expressed as a voltage ratio and corresponds to 12.8 decibels.

Accordingly, we now construct a double-tuned circuit or its equivalent T of inductances so that the input terminating resistance is 265.788 ohms and employ a coil having an inductance of 1.3105 $\mu$h. The output terminating resistance which we used is 832.850 ohms and the output coil will have an inductance of 3.6039 $\mu$h. The co-efficient of coupling between the coils is .826043.

It will be seen that the input tuned circuit, considering its inductance and capacitance, is tuned to a frequency of 41.918 mc. and that the output circuit is tuned to the same frequency of 41.918 mc. Due to the interaction of the two circuits, however, occasioned by their coupling, the resonant frequency of the network $\omega_0$ is 74.375 mc. It will be noted that this frequency is different from the mid-frequency of 60 mc.

The characteristic curve of a filter built in accordance with my invention in the example just given will have peaks corresponding to 81.455 mc. and 38.275 mc. which, it will be observed, are substantially symmetrical with respect to the mid-frequency of 60 mc. Furthermore, the low frequency of the pass band will be found to be at 30 mc. and the high frequency of the pass band will be found to be at 90 mc. Furthermore, it will be found that the frequency characteristic curve will dip between the peaks within the desired limit of .2 decibel.

It will be seen that I have built an interstage filter having the required band width of 60 mc. centered at a frequency of 60 mc. for use as an interstage filter in a circuit which has a total input capacitance of 11 mmf. and a total output capacitance of 4 mmf. The deleterious effects of the prior art have been avoided in that peak of the frequency characteristic curve above resonance is symmetrical with the peak of the frequency characteristic curve below resonance. Furthermore, both peaks are symmetrical at the frequency of their occurrence and are of substantially the same amplitude. My filter has the desired predetermined characteristic and hence is controllable on both sides of mid-frequency over the desired band width. The ratio of band width to mid-frequency approaches 200%. I have accomplished my unexpected results with the use of single inductance coils, single resistors and single capacitors for each of the meshed circuits. My filter avoids the necessity of using stagger-tuned interstages or triple-tuned circuits.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A coupling filter having a predetermined band width of pass band, including in combination a first tuned circuit having a first capacitance and a first inductance connected in parallel, a second tuned circuit having a second capacitance and a second inductance connected in parallel, the first circuit being tuned to the same frequency as the second circuit, said circuits being coupled together with a predetermined coefficient of coupling to form a filter network having a double-parked characteristic curve with a predetermined variation in gain over the pass band, said network having a resonant frequency different from the frequency of the tuned circuits and different from the mid-freqnency of the pass band, the peaks of the characteristic curve being substantially of the same amplitude and occurring substantially symmetrically with the mid-frequency, the network having an input terminating resistance and an output terminating resistance, said terminating resistances being different from the respective input and output characteristic image impedances at mid-frequency, the ratio of the input terminating resistance to the input characteristic image impedance at mid-frequency being predetermined and equl to the ratio of the output terminating resistance to the output characteristic image impedance at mid-frequency.

2. A coupling filter as in claim 1, in which the first capacitance is different from the second capacitance, the first inductance is different from the second inductance and the input terminating resistance is different from the output terminating resistance.

3. A coupling filter as in claim 1 in which the maximum variation in gain over the pass band occurs substantially at mid-frequency.

4. A coupling filter as in claim 1 in which the ratio of the actual terminating resistance to the corresponding characteristic image impedance at mid-frequency is represented by the expression $$\sqrt{\frac{1-b^2}{2(1-a)}}$$

where:

$$b^2=(1-K^2)t_0^4$$

$$a=\left(\frac{2+K^2}{2}\right)t_0^2$$

$$t_0^2=\frac{6}{(2+K^2)+2(4-K^2)\cos\theta}$$

$$\cos\frac{3\theta}{2}=\frac{K^2}{|\cos\gamma_0|\sqrt{T}}$$

$$T=\left(\frac{4-K^2}{3}\right)^3$$

$$\gamma_0=\sin^{-1}y_0$$

$$K=\frac{\text{band width}}{2\text{ mid-frequency}}$$

and $y_0$ is the unitized gain at mid-frequency.

5. A coupling filter as in claim 1, in which said predetermined coefficient of coupling is $$\sqrt{1-b^2}$$

where:

$$b^2=(1-K^2)t_0^4$$

$$t_0^2=\frac{6}{(2+K^2)+2(4-K^2)\cos\theta}$$

$$\cos\frac{3\theta}{2}=\frac{K^2}{|\cos\gamma_0|\sqrt{T}}$$

$$T=\left(\frac{4-K^2}{3}\right)^3$$

$$\gamma_0=\sin^{-1}y_0$$

$$K=\frac{\text{band width}}{2\text{ mid-frequency}}$$

and $y_0$ is the unitized gain at mid-frequency.

6. A coupling filter as in claim 1, in which the frequency of each tuned circuit is represented by the expression $$\frac{1}{\sqrt{LC}}$$

where L is the first inductance and C is the first capacitance, or L is the second inductance and C is the second capacitance, the resonant frequency of the network is represented by the expression $$\frac{\omega_M}{t_0}$$

where: $\omega_M$ is the mid-frequency, $$t_0^2=\frac{6}{(2+K^2)+2(4-K^2)\cos\theta}$$

$$\cos\frac{3\theta}{2}=\frac{K^2}{|\cos\gamma_0|\sqrt{T}}$$

$$T=\left(\frac{4-K^2}{3}\right)^3$$

$$\gamma_0=\sin^{-1}y_0$$

$$K=\frac{\text{band width}}{2\text{ mid-frequency}}$$

and $y_0$ is the unitized gain at mid-frequency.

References Cited in the file of this patent

UNITED STATES PATENTS

| | | |
|---|---|---|
| 2,131,193 | Schlesinger | Sept. 27, 1938 |
| 2,152,823 | Schdesinger | Apr. 4, 1939 |
| 2,185,879 | Allen | Jan. 2, 1940 |
| 2,225,085 | Schlesinger | Dec. 17, 1940 |
| 2,397,850 | Ford | Apr. 2, 1946 |
| 2,404,270 | Bradley | July 16, 1946 |